Nov. 21, 1961  R. J. HARRY  3,009,219
COMBINATION STRIPPER AND INGOT AND MOLD HANDLING CRANES
Filed Feb. 5, 1959  6 Sheets-Sheet 1

Fig.I.

INVENTOR.
Robert J. Harry
BY *Hoopes, Leonard & Buell*

ATTORNEYS.

Nov. 21, 1961 R. J. HARRY 3,009,219
COMBINATION STRIPPER AND INGOT AND MOLD HANDLING CRANES
Filed Feb. 5, 1959 6 Sheets-Sheet 2

INVENTOR.
Robert J. Harry
BY
ATTORNEYS.

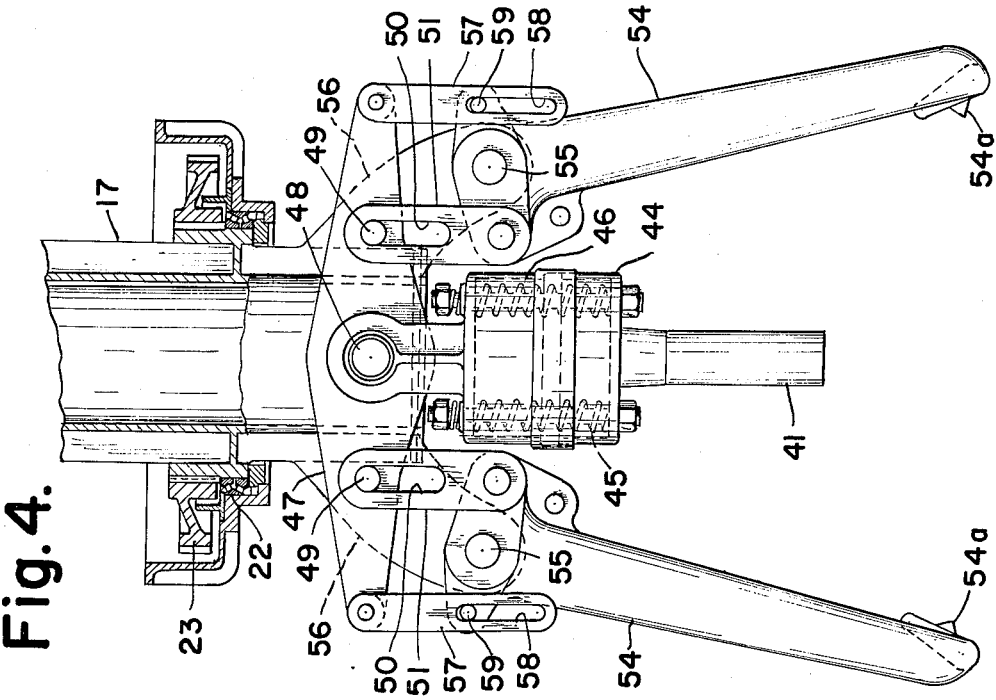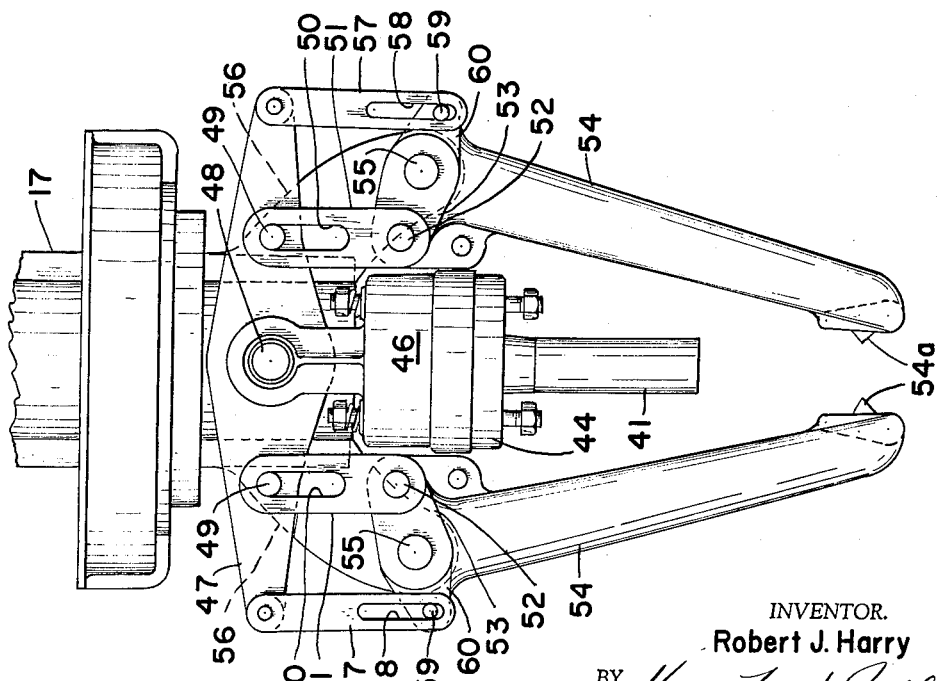

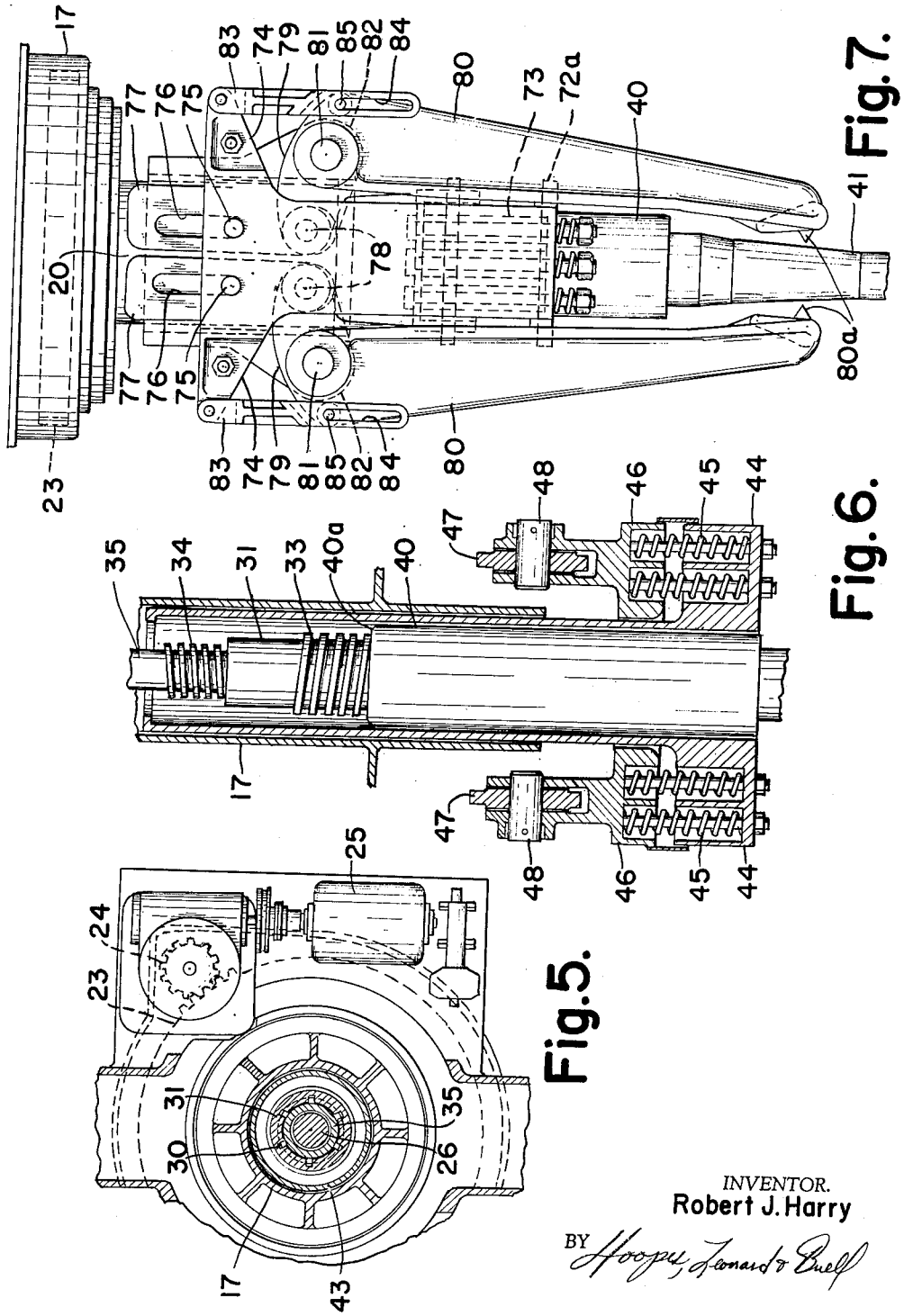

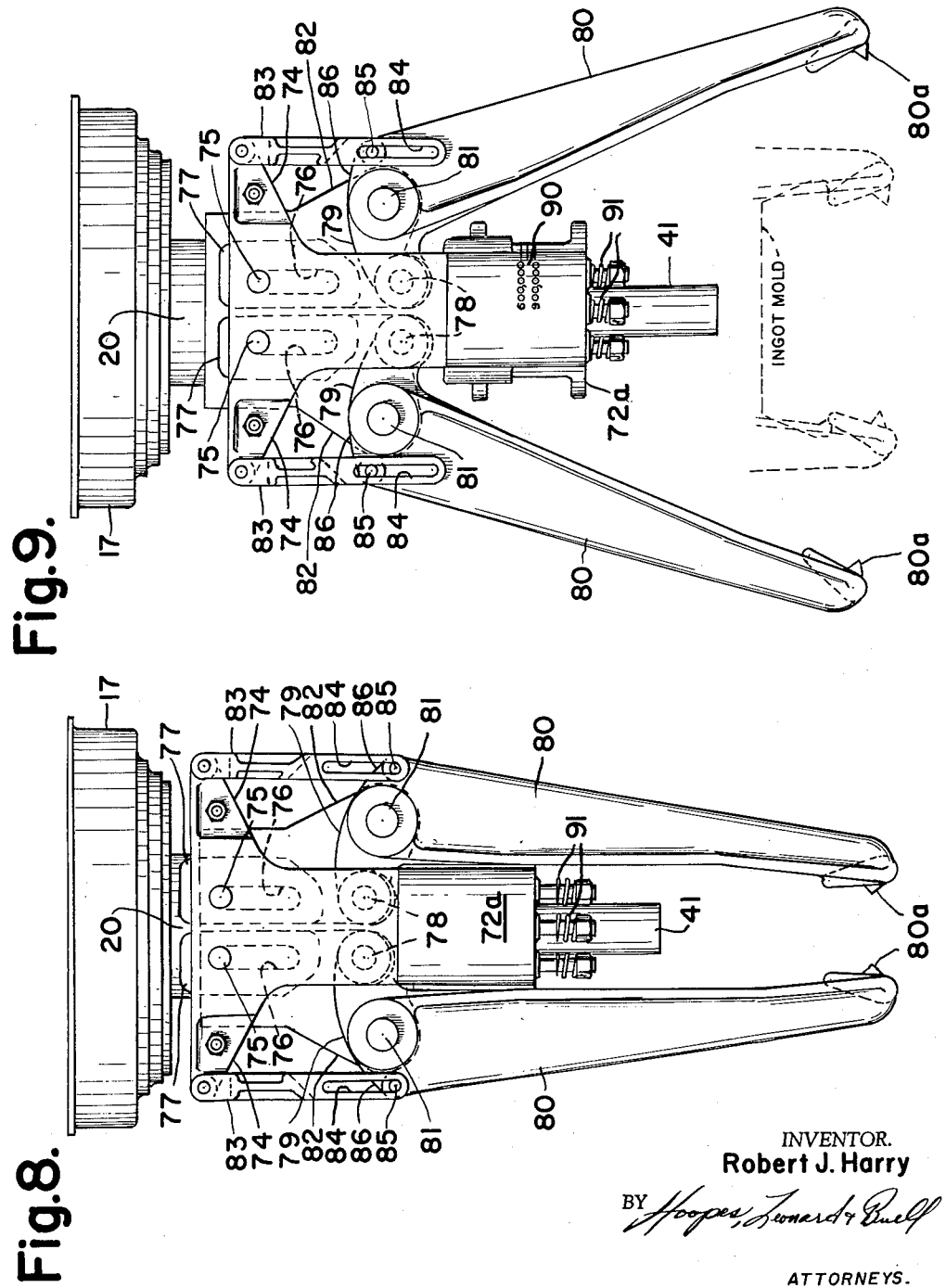

Nov. 21, 1961  R. J. HARRY  3,009,219
COMBINATION STRIPPER AND INGOT AND MOLD HANDLING CRANES
Filed Feb. 5, 1959  6 Sheets-Sheet 6

INVENTOR.
Robert J. Harry
BY *Hooper, Leonard & Buell*

ATTORNEYS.

United States Patent Office 3,009,219
Patented Nov. 21, 1961

3,009,219
COMBINATION STRIPPER AND INGOT AND
MOLD HANDLING CRANES
Robert J. Harry, Alliance, Ohio, assignor to The Alliance Machine Company, a corporation of Ohio
Filed Feb. 5, 1959, Ser. No. 791,375
7 Claims. (Cl. 22—95)

This invention relates to a combination stripper and ingot and mold handling crane and in particular to a crane capable of performing the duties of a standard stripping crane as well as handling stripped ingots, molds and the like. Means for stripping ingots are as old as the steel industry itself and they have taken many shapes and forms. Hydraulic strippers and screw type strippers have been proposed. For example, in the early days of the steel industry, hydraulic strippers were provided on a stationary bridge and the trolley to which the stripper was attached traveled on the bridge so as to cover more than one track on which ingots to be stripped might be located. In a latter development in the industry, screw type strippers driven by electric motors were arranged to travel on a bridge and the bridge in turn was designed to operate an a runway covering the full length of the area in which stripping operations were to be carried out. This latter development of the screw type stripper had very definite advantages over the old stationary hydraulic stripper, particularly in its mobility. However, strippers generally were unable to satisfactorily pick up ingots and molds located at any position on the stripping floor. As a result, it was necessary to provide a separate crane for handling stripped ingots and ingot molds.

In the instant invention, I provide a crane which is capable of ingot stripping as well as ingot and mold handling. I provide a stripper which may pick up ingots and molds without regard to their position and without reliance on lugs or other projections.

Preferably, I provide in a mechanism for stripping ingots or the like a track supported above an area where stripping or the like is to be carried out, movable bridge means movable along the track of said area, carrier means on the bridge means movable thereon transversely to the track, hoisting means on the carrier means, frame means depending from the hoisting means and movable in the vertical direction on guideways on the carrier means, inner frame means rotatably mounted in the depending frame means for rotation through 360°, extensible means in said inner frame movable longitudinally of the frame, ram means on said extensible means movable therewith, gripping means pivotally mounted on the inner frame, resilient means acting on said gripping means to urge them in the closed position when the extensible means is in its innermost position in the frame and link means connecting said resilient means and said gripping means whereby to transmit the force of the resilient means to the gripping means when the extensible means is in its innermost position and acting on said gripping means to transmit the load of the extensible means on the tongs when the extensible means is in its outermost position. Preferably, the resilient means are a bank of springs acting on a series of links connected to the gripping members. Preferably, the extensible means is actuated through a planetary gearing and screwing mechanism.

Certain features, objects and advantages of this invention have been described above. However, other details, objects and advantages of the invention will become apparent from the following description and from the accompanying drawings illustrating certain present preferred embodiments of my invention in which, FIGURE 1 is a side elevation of an ingot stripper and trolley suspension according to the invention;

FIGURE 3 is a vertical section through the frame means depending from the hoisting means showing the extensible means in its innermost position, with tongs power closed;

FIGURE 4 is a vertical section through the frame means depending from the hoisting means showing the extensible means in its intermediate position with tongs gravity opened;

FIGURE 5 is a section on the line IV—IV of FIGURE 1;

FIGURE 6 is a vertical section through the supporting sleeve of the inner member;

FIGURE 7 is a side elevation of a second embodiment of my invention with the extensible means in the outermost position and the tongs gravity closed;

FIGURE 8 is a side elevation of the embodiment of FIGURE 7 with the extensible means in the innermost position and the tongs power closed;

FIGURE 9 is a side elevation of the embodiment of FIGURE 7 with the extensible means in the intermediate position and the tongs gravity opened;

Figure 1:
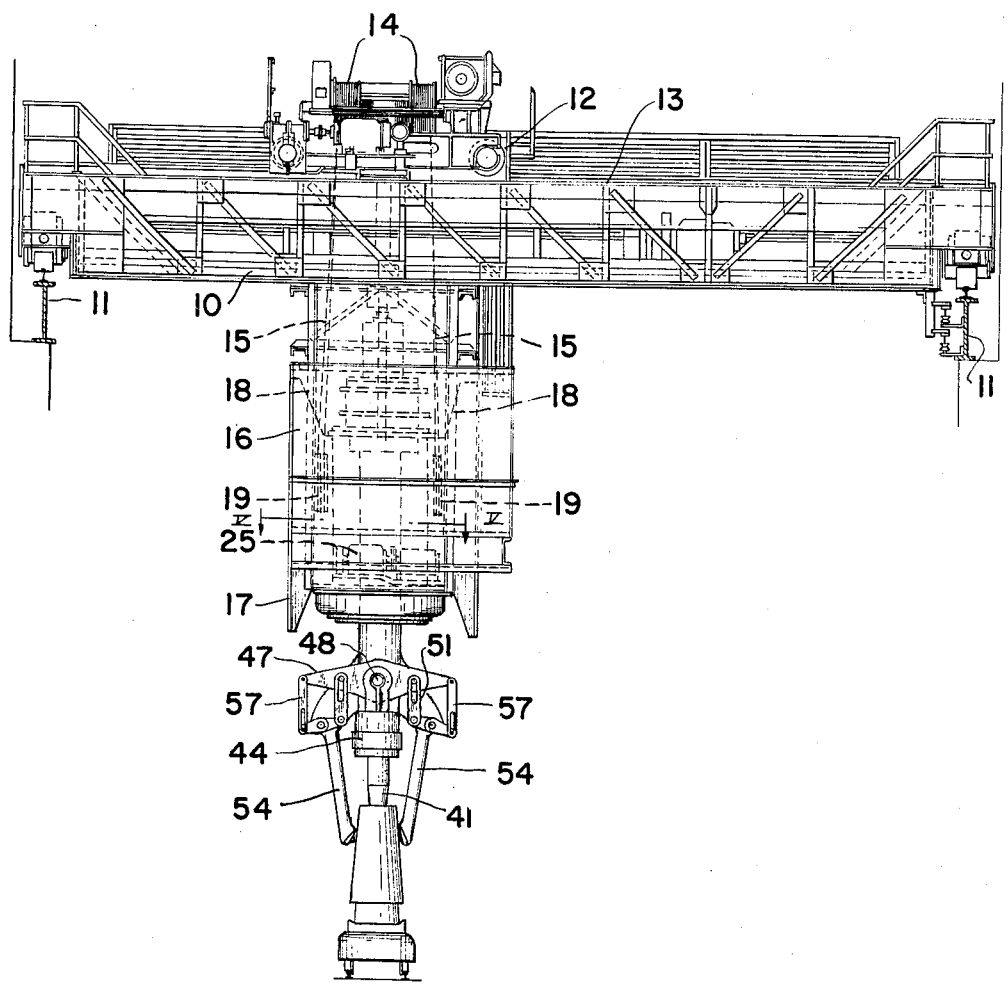

Referring to the drawings, I have illustrated a travelling bridge 10 mounted on rails 11 on opposite sides of the stripping floor; a trolley or carriage 12 is mounted on rails 13 on the bridge for travel thereon transverse to rails 11. The trolley carries a motor driven drum 14 from which depend suspension cables 15. The cables 15 are extended and withdrawn as the drum 14 is rotated clockwise and counterclockwise on its axis. All of this suspension is of conventional design. Suspended below the trolley and permanently attached thereto is a framework 16 within which the housing 17 of the stripper frame proper is designed to slide vertically in inner guideways 18. Sheaves 19 in housing 17 receive the cables 15 whereby the housing is raised and lowered in guideways 18.

An inner frame 20 is mounted at top and bottom for rotation in bearings 21 and 22 in the housing 17. A peripheral pinion gear 23 surrounds and is fixed to inner frame 20 adjacent one end and is driven by drive pinion 24 on motor 25 mounted in housing 17. Inner frame 20 can accordingly be rotated about a vertical axis to any position with respect to housing 17.

A shaft 26 having splines 27 at one end is driven from the opposite end by planetary gearing 28 from motor 29 on the top of housing 17. The splines 27 engage slots 30 in the inner periphery of elongated cylindrical nut 31 which is threaded internally 32 and externally 33 with opposite threads, e.g., right-hand on the inside and left hand on the outside. The inside threads 32 engage threads 34 on a stationary screw 35 surrounding the shafts 26 and suspended from a supporting ring 36 adjacent the top of housing 17 and held in place by a key 37 and nut 38. The outside threads 33 of nut 31 engage internal threads 39 on sleeve 40 movable axially of housing 17. A bull nose 41 is fixed to the end of sleeve 40 and moves with it. It is evident that for every revolution of shaft 26 the nut 31 will move one thread with reference to the stationary screw 35 and the sleeve 40 will move one thread in the same direction on nut 31 making a total travel of two threads for each revolution of shaft 26.

When the sleeve 40 is raised to the extreme upper position (see FIGURE 3) the upper extremity 40a of sleeve 40 engages a lug 42 on the upper end of sleeve 43 which is vertically movable coaxially of sleeve 40 within housing 17. Vertical movement of sleeve 43 causes lug 44 on the lower end of sleeve 43 to compress springs 45 which are mounted thereon. A spring bracket 46 rests on the uppermost ends of springs 44 and compression of springs 45 causes this bracket 46 to be moved vertically upwardly. A lever 47 is pivoted at its mid point on pin 48 through bracket 46 and movement of bracket 46 is accordingly transmitted to lever 47. Mounted between pin 48 and the ends of levers 47 are pins 49 which are slidably engaged in slots 50 in one end of links 51. The opposite end of links 51 are pivoted on pins 52 on crank arms 53 projecting from tongs 54. Tongs 54 are in turn pivoted on pins 55 in downwardly projecting arms 56 fixed to the bottom of housing. When lever 47 is vertically raised pins 49 engage the upper end of slots 50 of links 51 which in turn act on crank arms 53 to close tongs 54. In this manner a very powerful force is exerted on the tongs 54 and bits 54a to enable them to engage and handle loose ingots, slabs, molds and other miscellaneous material.

When sleeve 40 is lowered by turning shaft 26, the springs 45 elongate until free. Further lowering of sleeve 40 results in lever 47 being simultaneously lowered. This causes the weight of links 51 and lever 47 to press downwardly on crank arms 53 causing tongs 54 to swing outwardly and open. At this point the bull nose is still retracted away from the area of bits 54a and the tongs are in position to be lowered over a slab, ingot, mold or the like to be picked up (see FIGURE 4).

Figure 2:
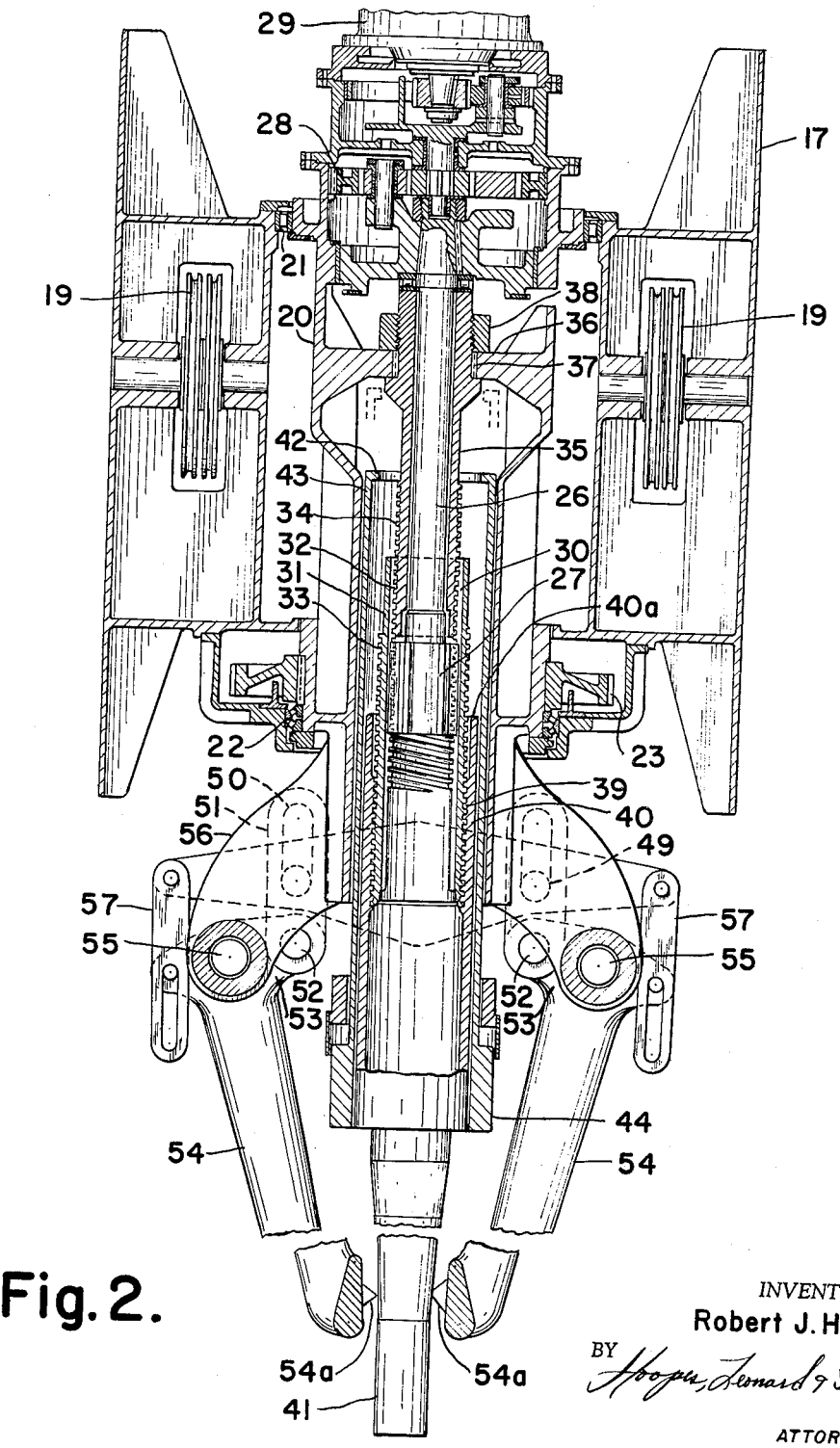
FIGURE 2 is a vertical section through the frame means depending from the hoisting means showing the extensible means in its outermost position, with tongs gravity closed.
Figure 11:
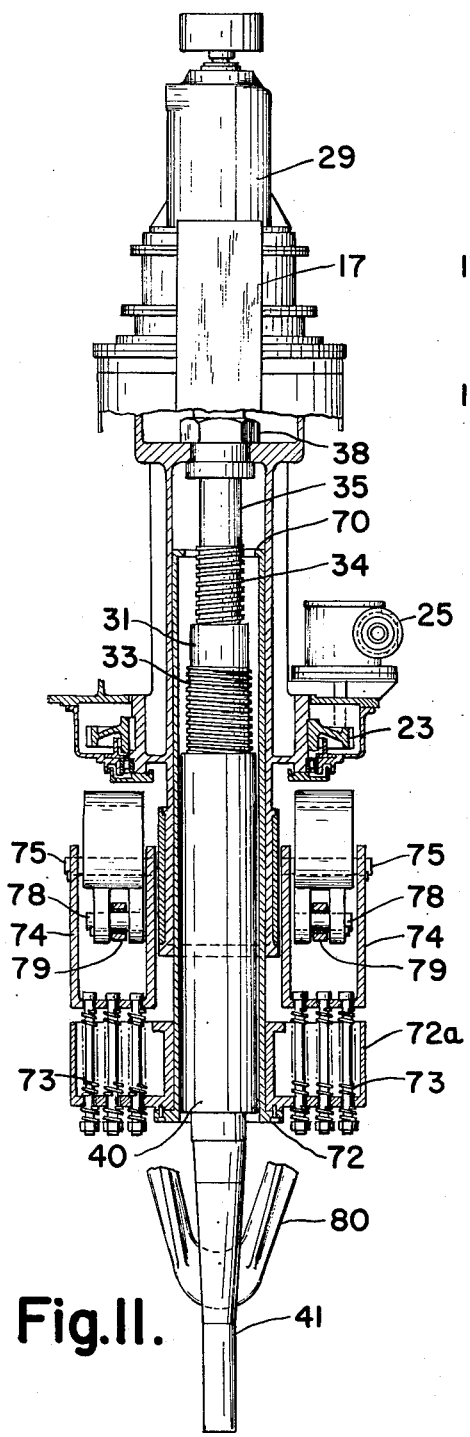
FIGURE 11 is a vertical section at right angles to the section of FIGURE 10.
Figure 10:
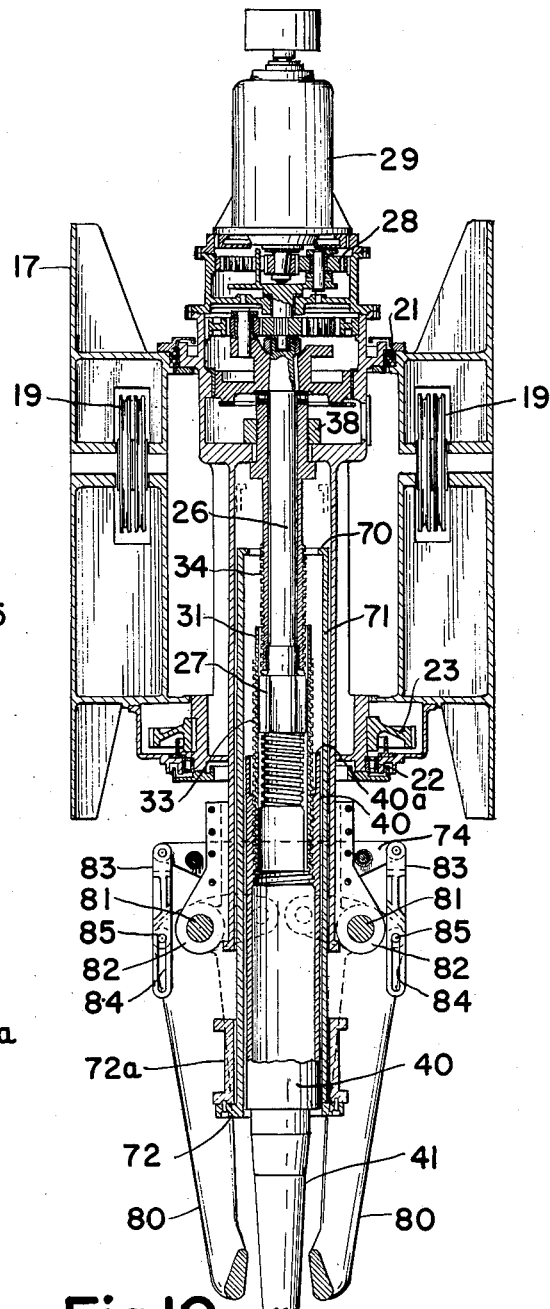
FIGURE 10 is a vertical section through the embodiment of FIGURE 7.

When it is desired to strip an ingot of the small end up type, the bull nose 41 is positioned over the ingot and sleeve 40 is lowered from the position shown in FIGURE 4 to that of FIGURE 2. This lowers bull nose 41 into contact with the head of the ingot and applies the entire weight of the sleeve 40, lever 47, links 51, springs 45 to act on links 57. Links 57 are pivoted at one end on the ends of lever 47 and at the other end are provided with slots 58 which slide on pins 59 in crank arms 60 on tongs 54. The weight of this assembly is such that the tongs are closed into engagement with the lugs on the ingot molds. Further downward movement of bull nose 41 forces the ingot out of the mold which is held by the tongs 54.

In the embodiment illustrated in FIGURES 7–11, I provide a different arrangement of actuating links and levers acting on the tongs. In FIGURES 7–11, I provide a supporting structure, sleeve and bull nose arrangement identical with that identified by the numerals 10—41 of FIGURES 1 through 6, and I shall, accordingly, use the same identifying numerals when referring to those parts which are identical. When, in the embodiment of FIGURES 7–11, the sleeve 40 is raised to the extreme upper position (see FIGURE 7) the upper extremity 40a of sleeve 40 engages a lug 70 on the upper end of sleeve 71 which is vertically movable coaxially of sleeve 40 within housing 17. Vertical movement of sleeve 71 causes lug 72 carrying spring base 72a on the lower end of sleeve 71 to compress springs 73 which are mounted thereon. A spring bracket 74 rests on the uppermost ends of springs 73 and compression of springs 73 causes this bracket 74 to be moved vertically upwardly. Pins 75 are mounted in the upper ends of bracket 74. The pins 75 are slidable in slots 76 in one end of links 77. Links 77 are in turn connected by pins 78 to crank arms 79 projecting from tongs 80. Tongs 80 are in turn pivotally mounted on pins 81 in outwardly projecting bosses 82 fixed to the bottom of housing 17. When bracket 74 is vertically raised pins 75 engage the upper end of slots 76 of links 77 which in turn act on crank arms 79 to close tongs 80 (see FIGURE 7). In this manner a very powerful force is exerted on the tongs 80 and bits 80a to enable them to engage and handle loose ingots, slabs, molds and other miscellaneous material.

When sleeve 40 is lowered by turning shaft 26, the springs 73 elongate until free. Further lowering of sleeve 40 results in bracket 74 being simultaneously lowered. This causes the weight of links 77 and bracket 74 to press downwardly on crank arms 79 causing tongs 80 to swing outwardly and open. At this point the bull nose is still retracted away from the area of bits 80a and the tongs are in position to be lowered over a slab, ingot, mold or the like to be picked up (see FIGURE 9).

When it is desired to strip an ingot of the small end up type, the bull nose 41 is positioned over the ingot and sleeve 40 is lowered from the position shown in FIGURE 9 to that of FIGURE 8. This lowers bull nose 41 into contact with the head of the ingot and applies the entire weight of the sleeve 40, bracket 74, links 77, springs 73 to act on links 83. Links 83 are pivoted at one end on the ends of bracket 74 and at the other end are provided with slots 84 which slide on pins 85 in the outer periphery 86 of tongs 80. The weight of this assembly is such that the tongs are closed into engagement with the lugs on the ingot molds. Further downward movement of bull nose 41 forces the ingot out of the mold which is held by the tongs 80.

Preferably the drive motor 29 is provided with a shunt on the motor armature to regulate the speed of entry into a stall as the maximum pressure is applied to the springs so as to prevent overload on the parts. This shunt is regulated so that the maximum pressure will not exceed the elastic limit of the springs.

I may and preferably do provide a scale arrangement on the spring housing which indicates roughly the pressure applied to any given load. Such a scale is illustrated at 90 on FIGURE 9.

Cushioning springs 91 (FIGURES 8–9) may be used to cushion the blow if the tongs accidentally slip from an ingot.

While I have illustrated and described certain preferred embodiments of my invention, it will be understood that this invention may be otherwise embodied within the scope of the following claims.

I claim:

1. In a mechanism for stripping ingots and the like having a track supported above an area where stripping and the like is to be carried out, and movable bridge means movable along the track over said area, carrier means on said bridge means movable thereon transversely to the track, hoisting means on the carrier means, frame means depending from the hoisting means and movable in the vertical direction thereby on guideways on the carrier means, inner frame means rotatably mounted in the depending frame means for rotation through 360°, extensible means in said inner frame means movable longitudinally thereof, ram means on said extensible means movable therewith, the improvement comprising gripping means pivoted on the inner frame, resilient means acting on said gripping means urging them to the closed position when the extensible means is in its innermost position in the frame, and link means connecting said resilient means and said gripping means whereby to transmit the force of the resilient means to the gripping means when the extensible means is in its innermost position and acting on said gripping means to transmit the load of the extensible means on the gripping means when the extensible means is in its outermost position.

2. In a mechanism for stipping ingots and the like having a track supported above an area where stripping and the like is to be carried out, and movable bridge means movable along the track over said area, carrier means on said bridge means movable thereon transversely to the track, hoisting means on the carrier means, frame means depending from the hoisting means movable in the vertical direction thereby on guideways on the carrier means, inner frame means rotatably mounted in the frame means for rotation through 360°, extensible means in said inner frame means movable longitudinally thereof, ram means on said extensible means movable therewith, the improvement comprising gripping means pivoted on the inner frame and depending therefrom, resilient means connecting said ram means and gripping means and link means on said resiliet means transmitting the force of the resilient means to the gripping means when the extensible means is in its innermost position and transmitting the load of the extensible means on the gripping means when the extensible means is in its outermost position.

3. In a mechanism for stipping ingots and the like having a track supported above an area where stripping and the like is to be carried out, movable bridge means movable along the track over said area, carrier means on said bridge means movable thereon transversely to the track, hoisting means on the carrier means, frame means depending from the hoisting means and movable in the vertical direction thereby on guideways on the carrier means, inner frame means rotatably mounted in the depending frame means for rotation through 360°, the improvement comprising extensible means in said inner frame means movable vertically thereof, a sleeve surrounding the extensible means for limited movement therewith, gripping means pivoted on the inner frame, resilient means on the sleeve and link means connecting said resilient means and said gripping means whereby the force of the resilient means acts on the gripping means to close them when the extensible means is at its highest vertical position and the load of the resilient means, the link means and extensible means acts on the gripping means to open them when the extensible means is in the intermediate position and to close the gripping means at the lowermost position of the extensible means.

4. In a mechanism for stripping ingots and the like having a track supported above an area where stripping and the like is to be carried out, movable bridge means movable along the track over said area, carrier means on said bridge means movable thereon transversely to the track, hoisting means on the carrier means, frame means depending from the hoisting means and movable in the vertical direction thereby on guideways on the carrier means, inner frame means rotatably mounted in the depending frame means for rotation through 360°, the improvement comprising extensible means in said inner frame means movable vertically independently of both frame means, means for positively moving said vertically extensible means reciprocably in the vertical direction, means on the frame whereby the inner frame means may be rotated, ram means on the extensible means movable therewith, gripping means pivoted on the inner frame, resilient means between said ram means, and to said gripping means and link means on said resilient means transmitting the force of the resilient means to the gripping means when the extensible means is in its uppermost position and transmitting the load of the extensible means on the gripping means when the extensible means is in its lowermost position.

5. In a mechanism for stripping ingots and the like having a track supported above an area where stripping and the like is to be carried out, movable bridge means movable along the track over said area, carrier means on said bridge means movable thereon transversely to the track, hoisting means on the carrier means, frame means depending from the hoisting means and movable in the vertical direction thereby on guideways on the carrier means, inner frame means rotatably mounted in the depending frame means for rotation through 360°, the improvement comprising extensible means in the inner frame means movable vertically independently of the frame means, means for positively moving said vertically extensible means reciprocably in the vertical direction, means on the frame whereby the inner frame means may be rotated, ram means on said extensible means movable therewith, gripping means on the inner frame means movable vertically therewith, sleeve means on the inner frame means movable vertically for limited movement with the extensible means, resilient means on said sleeve movable therewith, link means on the gripping means engageable with the resilient means whereby the resilient means is compressed and acts to close the gripping means when the extensible means is in its uppermost position and the resilient means is released to open the tongs when the extensible means reaches an intermediate position.

6. In a mechanism for stripping ingots and the like having a track supported above an area where stripping and the like is to be carried out, movable bridge means movable along the track over said area, carrier means on said bridge means movable thereon transversely to the track, hoisting means on the carrier means, frame means depending from the hoisting means and movable in the vertical direction thereby on guideways on the carrier means, inner frame means rotatably mounted in the depending frame means for rotation through 360°, the improvement comprising extensible means in the inner frame means movable vertically independently of the frame means, means for positively moving said vertically extensible means reciprocably in the vertical direction, means on the frame whereby the inner frame means may be rotated, gripping means on the inner frame means movable vertically therewith independently of the travel of said extensible means, sleeve means in the inner frame means surrounding the extensible means for limited vertical movement therewith, resilient means on the sleeve means, lever means on said resilient means urged in the vertical direction thereby, link means on the lever means and bell crank arms on the gripping means whereby when the sleeve is raised to its uppermost position with the extensible means the resilient means is compressed and the gripping means are closed and when the resilient means are released substantially free of load the gripping means are opened.

7. In a mechanism for stripping ingots and the like having a track supported above an area where stripping and the like is to be carried out, movable bridge means movable along the track over said area, carrier means on said bridge means movable thereon transversely to the track, hoisting means on the carrier means, frame means depending from the hoisting means and movable in the vertical direction thereby on guideways on the carrier means, inner frame means rotatably mounted in the frame means for rotation through 360°, the improvement comprising extensible means in the inner frame means movable vertically independently of the frame means, means for positively moving said vertically extensible means reciprocably in the vertical direction, means on the frame whereby the inner frame means may be rotated, ram means on the extensible means movable therewith, sleeve means on the inner frame surrounding the extensible means for limited vertical movement therewith, resilient means on the sleeve means, link means connecting the resilient means and the gripping means whereby the gripping means are closed when load is applied to the resilient means and open when the resilient means is free of load.

References Cited in the file of this patent

UNITED STATES PATENTS

| 781,688 | Speer et al. | Feb. 7, 1905 |
| 1,487,032 | Shutt | Mar. 18, 1924 |
| 1,853,846 | Borchert | Apr. 12, 1932 |
| 2,515,088 | Holston | July 11, 1950 |
| 2,842,821 | Harry | July 15, 1958 |

FOREIGN PATENTS

| 802,790 | Great Britain | Oct. 8, 1958 |
| 286,810 | Germany | Sept. 2, 1915 |